US011885776B2

(12) United States Patent
Yokoi

(10) Patent No.: US 11,885,776 B2
(45) Date of Patent: Jan. 30, 2024

(54) CHROMATOGRAPHY ANALYSIS SYSTEM

(71) Applicant: SHIMADZU CORPORATION, Kyoto (JP)

(72) Inventor: Yusuke Yokoi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 245 days.

(21) Appl. No.: 17/511,262

(22) Filed: Oct. 26, 2021

(65) Prior Publication Data

US 2023/0129403 A1 Apr. 27, 2023

(51) Int. Cl.
*G01N 30/28* (2006.01)
*G01N 30/32* (2006.01)
(Continued)

(52) U.S. Cl.
CPC ....... *G01N 30/28* (2013.01); *G01N 2030/027* (2013.01); *G01N 2030/3084* (2013.01); *G01N 2030/326* (2013.01)

(58) Field of Classification Search
CPC ............. G01N 30/28; G01N 2030/027; G01N 2030/3084; G01N 2030/326
See application file for complete search history.

(56) References Cited

U.S. PATENT DOCUMENTS

| 4,534,941 | A | 8/1985 | Stephens et al. |
| 5,744,029 | A * | 4/1998 | Li ........................ G01N 30/30 210/175 |

(Continued)

FOREIGN PATENT DOCUMENTS

| JP | 2011099679 A | 5/2011 |
| JP | 2011220789 A | 11/2011 |

(Continued)

OTHER PUBLICATIONS

"Tempearture as a variable in liquid chromatography: Development and application of a model for the separation of model drugs using water as the eluent" by Edge et al., Journal of Chromatography A, 1132 (2006) 206-210 (Year: 2006).*

(Continued)

*Primary Examiner* — Justin N Olamit
(74) *Attorney, Agent, or Firm* — Muir Patent Law, PLLC

(57) ABSTRACT

A chromatography analysis system includes a liquid delivery pump (2), an autosampler (4), a separation column (12), a column oven (6), a detector (8). The chromatography analysis system further comprising a shutdown execution part (22) configured to start shutdown to finally stop driving of the liquid delivery pump (2) and temperature control operation of the column oven (6) at a time when a predetermined situation occurs, by controlling operation of the liquid delivery pump (2) and the column oven (6), and a column protection temperature setter (24) configured to set a column protection temperature for preventing deterioration of the separation column (12) due to overheating. The shutdown execution part (22) is configured to stop driving of the heater (14) in a state where the liquid delivery pump (2) is driven when the shutdown is started, and then, stop driving of the liquid delivery pump (2) after a temperature of the internal space detected by the temperature sensor (18) becomes equal to or less than the column protection temperature.

7 Claims, 4 Drawing Sheets

(51) Int. Cl.
    *G01N 30/30*    (2006.01)
    *G01N 30/02*    (2006.01)

(56)          References Cited

U.S. PATENT DOCUMENTS 8,167,987  B2 *   5/2012  Tipler .................... G01N 30/32
                                                        95/87
   2017/0356890 A1 * 12/2017  Saito ..................... G01N 30/54
   2018/0093201 A1    4/2018  Yokoi et al.

FOREIGN PATENT DOCUMENTS

WO      2016120963   A1    8/2016
   WO      2016-157517  A    10/2016

OTHER PUBLICATIONS

"Clarus 500/580 GC User's Guide" by PerkinElmer, 2010 (Year: 2010).*
HPLC operating manual, Feb. 2010, available at: https://www2.kpu.ac.jp/life_environ/syn_chem_fm/Manual/HPLC-6A-9A.pdf.
Japanese first Office Action for application JP 2019-090902 dated Aug. 9, 2022, submitted with a machine translation.

* cited by examiner

CHROMATOGRAPHY ANALYSIS SYSTEM

TECHNICAL FIELD

The present invention relates to a chromatography analysis system (hereinafter, also simply referred to as an analysis system) such as a liquid chromatography analysis system or a supercritical fluid chromatography analysis system.

BACKGROUND ART

In liquid chromatography and supercritical fluid chromatography, an analysis system is sometimes configured by combining individual modules such as a liquid delivery pump, an autosampler, a column oven, and a detector (see Patent Document 1). In such an analysis system, there is one in which shutdown for putting each module constituting the analysis system into a resting state is automatically executed when analysis programmed in advance is completed.

When shutdown of the analysis system is executed, if operation of the liquid delivery pump is stopped in a state where the temperature in the column oven is high, the heat capacity of a separation column accommodated in the column oven rapidly decreases, the temperature of the separation column rapidly increases, and a filler in the separation column may deteriorate due to overheating. Further, some organic solvents used as a mobile phase have a low boiling point. When operation of the liquid delivery pump is stopped in a state where the temperature in the column oven is high, an organic solvent is considered to become an air bubble inside the separation column and damage the filler in the separation column.

In order to reduce the damage to the separation column as described above, conventionally, there has been employed a method in which the user stops the operation of the liquid delivery pump at an appropriate timing after the temperature in the column oven sufficiently decreases, or time required for the temperature in the column oven to sufficiently decrease in a standard analysis is measured in advance, and time (cooldown time) from when a temperature control function of the column oven is stopped to when the operation of the liquid delivery pump is stopped is set in the analysis system based on the measured time.

PRIOR ART DOCUMENT

Patent Document

Patent Document 1: WO2016/157517

SUMMARY OF THE INVENTION

Problems to be Solved by the Invention

In the method in which the user stops the operation of the liquid delivery pump at an appropriate timing, there is a problem that the user has to wait until the temperature in the column oven sufficiently decreases. Further, in the method of setting the cooldown time in the analysis system, it is necessary to measure the cooldown time according to an analysis condition when performing a non-standard analysis, and there is a problem that it takes extra time and effort before starting an analysis.

The present invention has been made in view of the above problems, and an object of the present invention is to enable shutdown of an analysis system to be appropriately executed without the user performing complicated work.

Solutions to the Problems

A chromatography analysis system according to the present invention includes a liquid delivery pump configured to deliver a mobile phase, an autosampler fluidly connected downstream of the liquid delivery pump and configured to inject a sample into the mobile phase delivered by the liquid delivery pump, a separation column that is fluidly connected downstream of the autosampler and is for separating a sample into components, a column oven having an internal space accommodating the separation column, a heater for heating inside of the internal space, and a temperature sensor for detecting a temperature of the internal space, the column oven having a temperature control function of controlling a temperature of the separation column at a temperature higher than room temperature, a detector configured to detect the components in eluate from the separation column, a shutdown execution part configured to start shutdown to finally stop driving of the liquid delivery pump and temperature control operation of the column oven at a time when a predetermined situation occurs, by controlling operation of the liquid delivery pump and the column oven, and a column protection temperature setter configured to set a column protection temperature for preventing deterioration of the separation column due to overheating. The shutdown execution part is configured to stop driving of the heater of the column oven in a state where the liquid delivery pump is driven when the shutdown is started, and then stop driving of the liquid delivery pump after a temperature of the internal space detected by the temperature sensor becomes equal to or less than the column protection temperature.

Effects of the Invention

The chromatography analysis system according to the present invention is configured such that, when shutdown is started, driving of the heater of the column oven is stopped in a state where the liquid delivery pump is driven, and then driving of the liquid delivery pump is stopped after the temperature of the internal space of the column oven becomes equal to or less than the column protection temperature. Therefore, liquid delivery by the liquid delivery pump is not stopped in a state where the temperature in the column oven is high, and it is possible to prevent deterioration of the separation column due to overheating.

EMBODIMENTS OF THE INVENTION

Hereinafter, an embodiment of an analysis device according to the present invention will be described with reference to the accompanying drawings.

Figure 1:
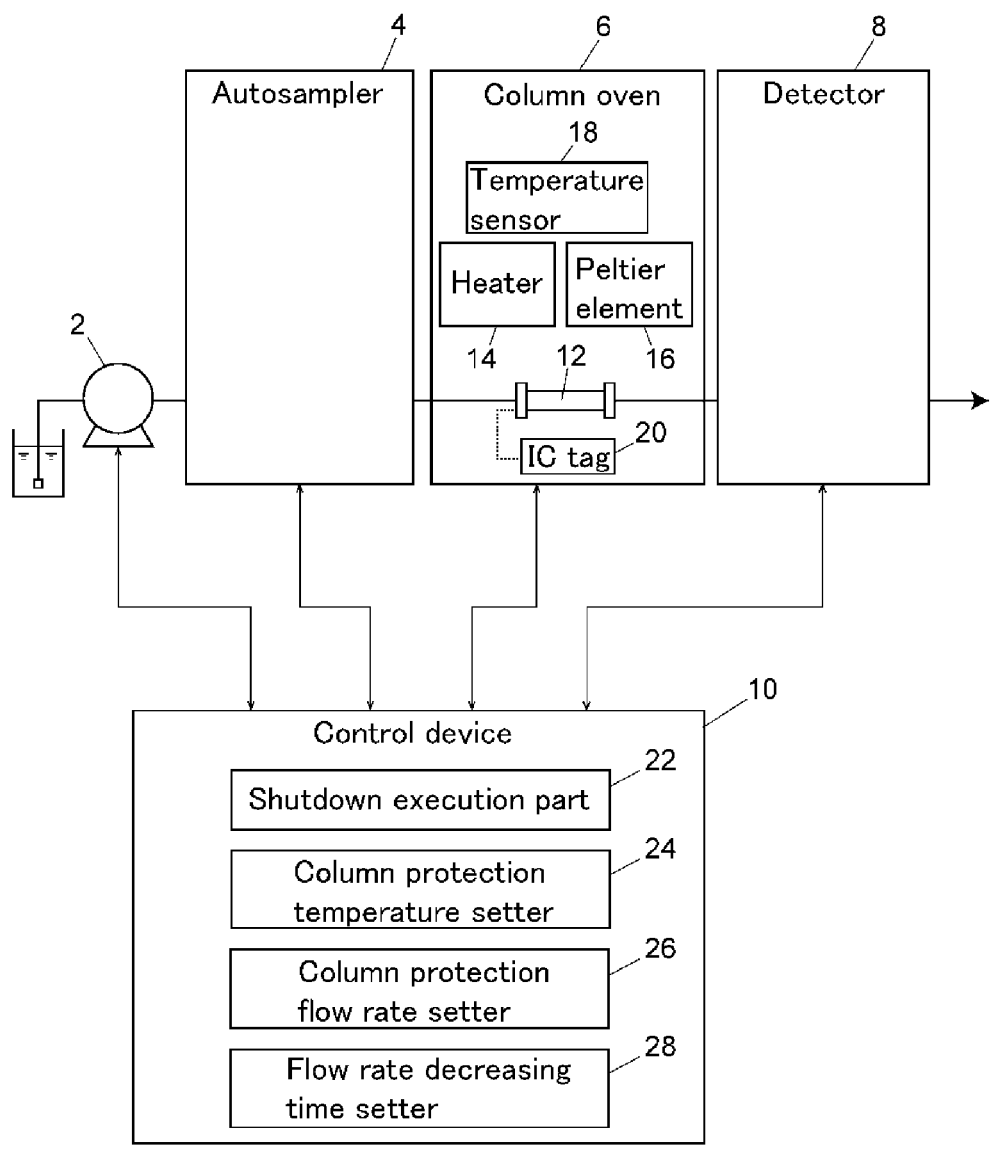
FIG. 1 is a schematic configuration diagram illustrating one embodiment of a chromatography analysis system.

As illustrated in FIG. 1, the analysis system of the present embodiment includes a liquid delivery pump 2, an autosampler 4, a column oven 6, a detector 8, and a control device 10.

The liquid delivery pump 2 is for delivering a mobile phase. In FIG. 1, the liquid delivery pump 2 is drawn to deliver one type of solution as a mobile phase. However, one that is configured to be able to deliver two or more types of solution as a mobile phase is also included.

The autosampler 4 is fluidly connected downstream of the liquid delivery pump 2, and injects a sample into a mobile phase delivered by the liquid delivery pump 2.

The column oven 6 has an internal space for accommodating a separation column 12 fluidly connected downstream of the autosampler 4. A heater 14, a Peltier element 16, and a temperature sensor 18 are provided in an internal space of the column oven 6. Output of the heater 14 and the Peltier element 16 are controlled such that the temperature in an internal space detected by the temperature sensor 18 is adjusted to a preset temperature. That is, the column oven 6 performs temperature control operation of adjusting the temperature of the separation column 12 accommodated in an internal space to a preset temperature.

An IC tag 20 (column information holder) is attached to the separation column 12. The IC tag 20 holds information (column information) related to the separation column 12. The IC tag 20 is electrically connected to an electronic circuit board (not illustrated) mounted on the column oven 6, and reading of column information from the IC tag 20 and writing of column information to the IC tag 20 are performed via the electronic circuit board. The column information held in the IC tag 20 includes at least a specification temperature of the separation column 12. The specification temperature means an upper limit temperature for properly using the separation column 12 (so as not to damage the filler). Other than the above, the IC tag 20 may hold ID information of the separation column 12 and information such as the number of times of analysis as column information.

The detector 8 detects a sample component in eluate from the separation column 12.

The control device 10 performs information communication with the liquid delivery device 2, the autosampler 4, the column oven 6, and the detector 8 to control operation of the liquid delivery device 2, the autosampler 4, the column oven 6, and the detector 8. The control device 10 can be realized by a dedicated computer or a general-purpose computer including a central processing unit (CPU) and a storage device.

The control device 10 includes a shutdown execution part 22, a column protection temperature setter 24, a column protection flow rate setter 26, and a flow rate decreasing time setter 28. The shutdown execution part 22, the column protection temperature setter 24, the column protection flow rate setter 26, and the flow rate decreasing time setter 28 are functions obtained by the CPU of the control device 10 executing a program.

The shutdown execution part 22 is configured to execute shutdown of the analysis system in a predetermined procedure when a predetermined situation occurs. The predetermined situation includes, for example, a situation in which all of the analysis programmed in advance is completed. The shutdown of the analysis system includes at least stopping the driving of the liquid delivery pump 2 and stopping temperature control operation of the column oven 6. Other than the above, the shutdown may include turning off a light source (not illustrated) provided in the detector 6. A detailed procedure of the shutdown will be described later.

The column protection temperature setter 24 is configured to set a temperature (column protection temperature) in the column oven 6 as a guide for stopping operation of the liquid delivery pump 2 at the time of shutdown. The column protection temperature is a temperature at which the temperature of the separation column 12 does not exceed the specification temperature even when operation of the liquid delivery pump 2 is stopped and a mobile phase does not flow in the separation column 12, and is a temperature for preventing the separation column 12 from deteriorating due to overheating.

The column protection temperature setter 24 is configured to read the specification temperature of the separation column 12 held by the IC tag 20 through the electronic circuit board of the column oven 6 and set the column protection temperature by using the use temperature. Further, the column protection temperature setter 24 may be configured to be able to set an optional temperature input by the user as the column protection temperature, or set the column protection temperature by using the specification temperature of the separation column 12 input by the user. Further, in a case of setting the column protection temperature by using the specification temperature of the separation column 12, the column protection temperature setter 24 can set the column protection temperature to a temperature at a certain ratio (for example, ½) of the specification temperature (when the specification temperature is 60° C., the column protection temperature is ° C.)

Further, as another embodiment, the column protection temperature setter 24 may be configured to obtain a boiling point of a mobile phase on the basis of information regarding the mobile phase registered in advance in the control device instead of or in addition to the specification temperature of the separation column 12 held in the IC tag 20, and set the column protection temperature at which the temperature of the separation column 12 does not exceed the boiling point.

Note that the column protection temperature setter 24 may be configured to set not only the column protection temperature by using the specification temperature of the separation column 12 and/or a boiling point of the mobile phase solvent but also a default value as the column protection temperature. That is, in addition to a mode in which the column protection temperature is automatically set by using the specification temperature of the separation column 12 and/or a boiling point of the mobile phase solvent, the user may be able to select a mode in which a default value is set as the column protection temperature. As the default value, a temperature (room temperature) of a space in which the analysis system is arranged can be used.

The shutdown execution part 22 is configured not to stop the driving of the liquid delivery pump 2 until the temperature of the internal space of the column oven 6 detected by the temperature sensor 18 becomes equal to or less than the column protection temperature set by the column protection temperature setter 24 at the time of shutdown.

As described above, at the time of shutdown, the liquid delivery pump 2 continues to operate until the temperature of the internal space of the column oven 6 becomes equal to or less than the column protection temperature. On the other hand, when a flow rate of a mobile phase flowing through the separation column 12 is the same as that at the time of analysis until the temperature of the internal space of the column oven 6 becomes equal to or less than the column protection temperature, high pressure is applied to the separation column 12, and there is a possibility that deterioration of the filler progresses.

In view of the above, in the present embodiment, a column protection flow rate setter 26 configured to set a liquid delivery flow rate (column protection flow rate) of the liquid delivery pump 2 for preventing deterioration of the separation column 12 due to pressure application is provided. The column protection flow rate setter is configured to set, as the column protection flow rate, a certain ratio (for example, ½) of a flow rate of a mobile phase at the time the shutdown is started, that is, a flow rate of the mobile phase of analysis performed immediately before the shutdown is started. Note that the column protection flow rate setter 26 may be configured to set an optional flow rate input by the user as the column protection flow rate.

The shutdown execution part 22 lowers operation speed of the liquid delivery pump 2 so that a liquid delivery flow rate of the liquid delivery pump 2 becomes the column protection flow rate set by the column protection flow rate setter 26 by the time the temperature of the internal space of the column oven 6 becomes equal to or less than the column protection temperature. At this time, if a flow rate of a mobile phase flowing through the separation column 12 rapidly changes, the filler may be damaged. For this reason, in the present embodiment, the shutdown execution part 22 is configured to gradually lower the operation speed of the liquid delivery pump 2 so that a flow rate of a mobile phase flowing through the separation column 12 becomes the column protection flow rate over predetermined time.

The flow rate decreasing time setter 28 is configured to set time (flow rate decreasing time) required to decrease the liquid delivery flow rate of the liquid delivery pump 2 to the column protection flow rate at the time of shutdown. The flow rate decreasing time setter 28 can set optional time input by the user as the flow rate decreasing time.

The shutdown execution part 22 is configured to decrease the liquid delivery flow rate of the liquid delivery pump 2 to the column protection flow rate in the set flow rate decreasing time after starting shutdown.

In a case where the column protection flow rate setter 26 is configured to set a flow rate of ½ of a flow rate of a mobile phase immediately before the start of shutdown as the column protection flow rate, the shutdown execution part 22 may be configured to gradually decrease the operation speed of the liquid delivery pump 2 so that the flow rate of the mobile phase becomes zero in the set flow rate decreasing time after the temperature of the internal space of the column oven 6 becomes the column protection temperature.

Figure 2:
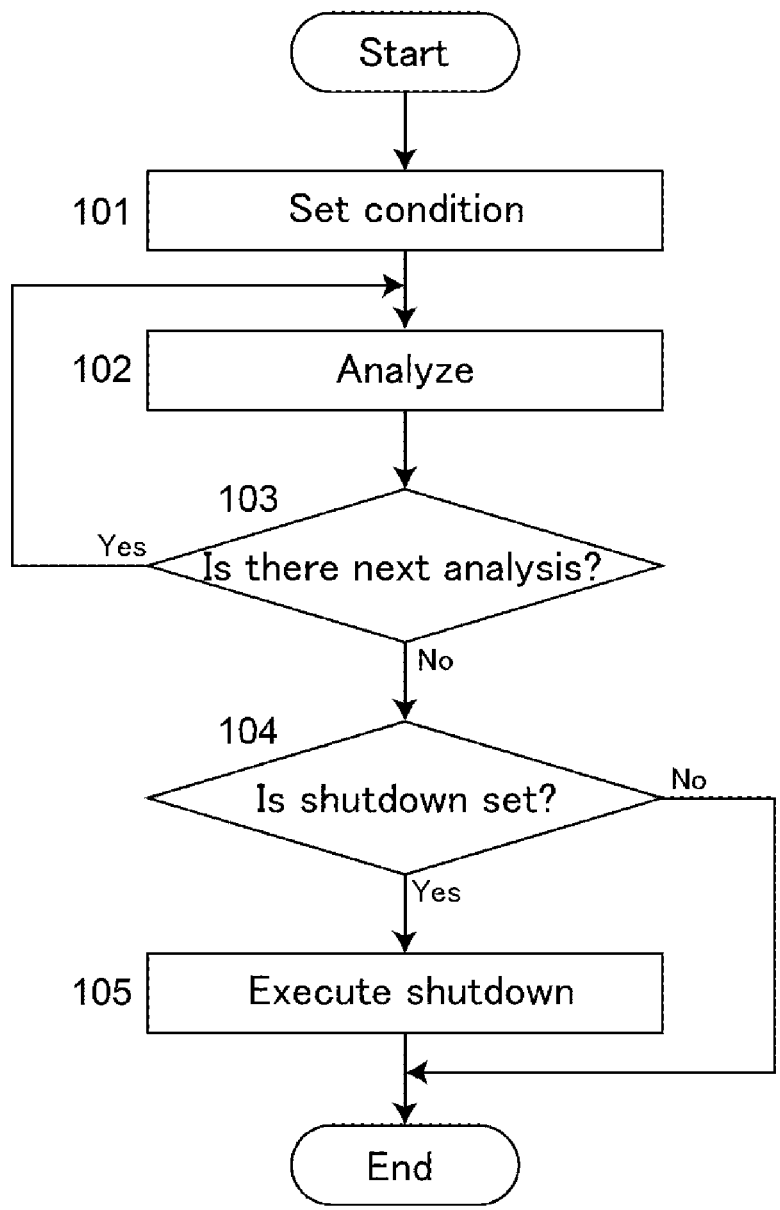
FIG. 2 is a flowchart illustrating an example of operation from before start of analysis to after end of analysis in the embodiment.

A series of operations from before the start of analysis to after end of the analysis in the present embodiment will be described by using a flowchart of FIG. 2 together with FIG. 1.

Before analysis is started, condition setting for analysis and shutdown is performed (Step 101). In this condition setting, whether or not to execute shutdown of the analysis system after end of all analyses is set, and in a case where shutdown is set to be executed after end of analysis, the column protection temperature setter 24 sets the column protection temperature and the flow rate decreasing time setter 28 sets the flow rate decreasing time. After the condition setting ends, a programmed analysis is performed (Step 102).

When all analyses programmed in advance end (Step 103), the shutdown execution part 22 executes shutdown in a predetermined procedure in a case where shutdown after end of analysis is set (Steps 104 and 105). In a case where the shutdown after end of analysis is not set, the analysis system stands by in an operating state even after all analyses programmed in advance end (Step 104).

Figure 3:
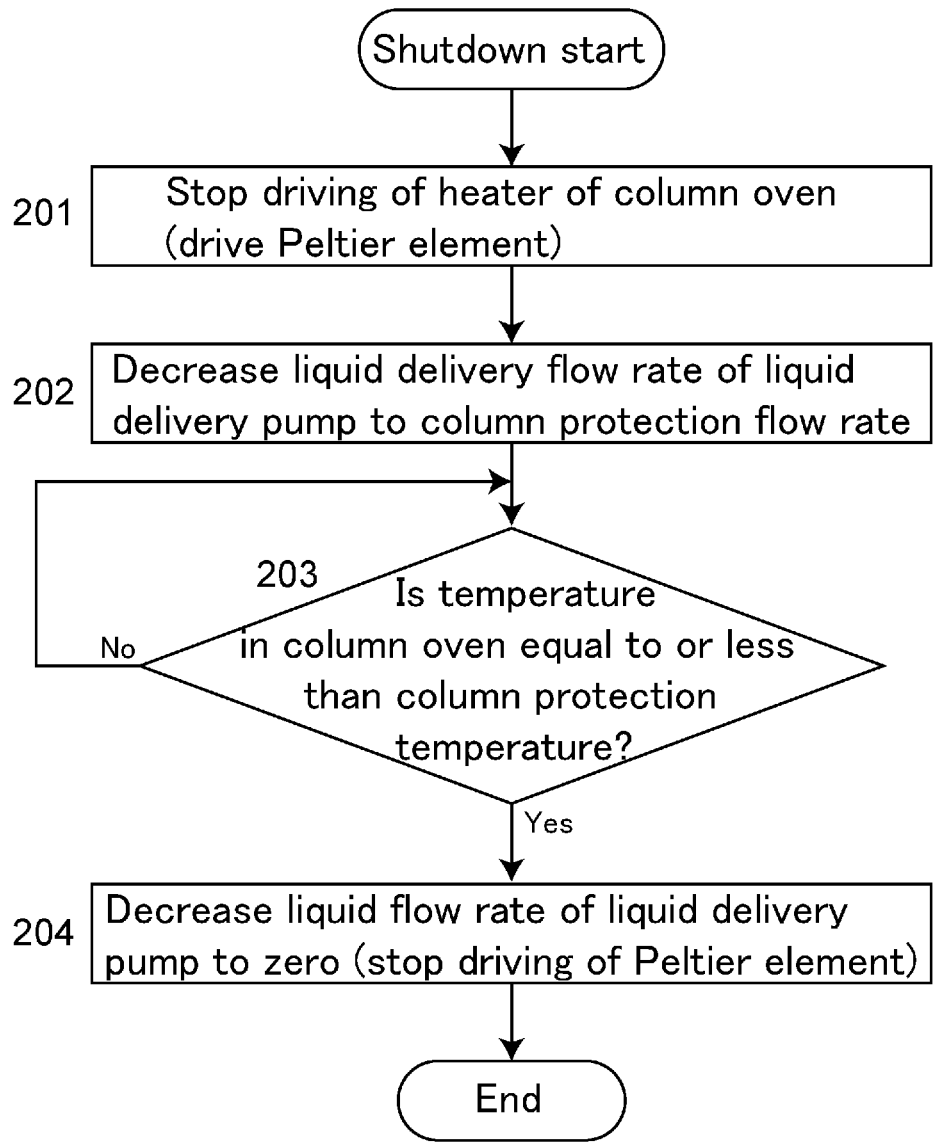
FIG. 3 is a flowchart illustrating an example of operation at the time of shutdown in the embodiment.
Figure 4:
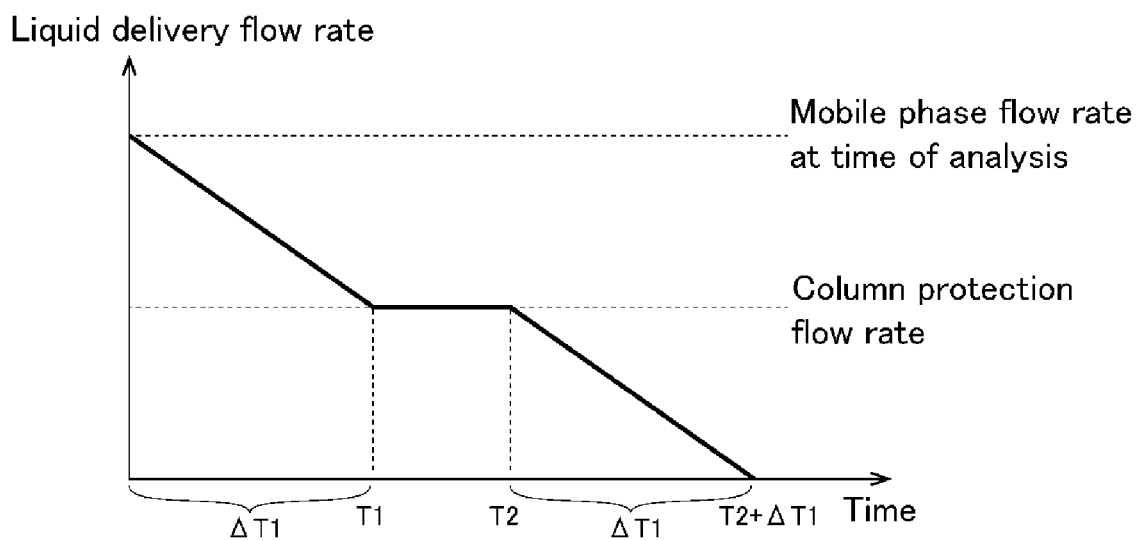
FIG. 4 is a graph illustrating an example of a time change in a liquid delivery flow rate at the time of shutdown in the embodiment.

Next, operation at the time of shutdown in the present embodiment will be described using a flowchart of FIG. 3 and a graph of FIG. 4 together with FIG. 1.

When shutdown is started, the shutdown execution part 22 first stops driving of the heater 14 of the column oven 6 (Step 201). After the driving of the heater 14 is stopped, the Peltier element 16 may be driven to cool the internal space of the column oven 6 in order to quickly lower the temperature of the internal space of the column oven 6. The shutdown execution part 22 gradually decreases the operation speed of the liquid delivery pump 2 so that the liquid delivery flow rate of the liquid delivery pump 2 becomes the column protection flow rate set by the column protection flow rate setter 24 in column flow rate decreasing time $\Delta T1$ set in advance (Step 202). Then, when the liquid delivery flow rate of the liquid delivery pump 2 decreases to the column protection flow rate before time T2 at which the temperature of the internal space of the column oven 6 decreases to the column protection temperature, the liquid delivery flow rate of the liquid delivery pump 2 is maintained at the column protection flow rate until the time T2 at which the temperature of the internal space of the column oven 6 decreases to the column protection temperature (Step 203).

When the temperature of the internal space of the column oven 6 becomes equal to or less than the column protection temperature (Step 203), the shutdown execution part 22 gradually decreases the operation speed of the liquid delivery pump 2 so that the liquid delivery flow rate of the liquid delivery pump 2 becomes zero in the flow rate decreasing time $\Delta T1$ (Step 204). When the Peltier element 16 is driven, the driving of the Peltier element 16 is stopped at a predetermined timing. Examples of the timing of stopping the driving of the Peltier element 16 include a timing (T2) when the temperature of the internal space of the column oven 6 reaches the column protection temperature, a timing (T2+$\Delta T1$) when the liquid delivery flow rate of the liquid delivery pump 2 becomes zero, and the like.

In the above embodiment, the liquid chromatography analysis system is described as an example of the analysis system. However, the present invention is not limited to the embodiment, and can be similarly applied to a supercritical fluid chromatography analysis system. The embodiments of the gas separation system according to the present invention are as described below.

The embodiment of the chromatography analysis system according to the present invention includes a liquid delivery pump (2) configured to deliver a mobile phase, an autosampler (4) fluidly connected downstream of the liquid delivery pump (2) and configured to inject a sample into the mobile phase delivered by the liquid delivery pump (2), a separation column (12) that is fluidly connected downstream of the autosampler and is for separating a sample into components, a column oven (6) having an internal space accommodating the separation column, a heater (14) for heating inside of the internal space, and a temperature sensor (18) for detecting a temperature of the internal space, the column oven (6) having a temperature control function of controlling a temperature of the separation column (12) at a temperature higher than room temperature, a detector (8) configured to detect the components in eluate from the separation column (12), a shutdown execution part (22) configured to start shutdown to finally stop driving of the liquid delivery pump (2) and temperature control operation of the column oven (6)

at a time when a predetermined situation occurs, by controlling operation of the liquid delivery pump (2) and the column oven (6), and a column protection temperature setter (24) configured to set a column protection temperature for preventing deterioration of the separation column (12) due to overheating. The shutdown execution part (22) is configured to stop driving of the heater (14) of the column oven (6) in a state where the liquid delivery pump (2) is driven when the shutdown is started, and then stop driving of the liquid delivery pump (2) after a temperature of the internal space detected by the temperature sensor (18) becomes equal to or less than the column protection temperature.

A first aspect of the embodiment of the analysis system according to the present invention further includes a column information holder (20) holding at least a specification temperature of the separation column (12), and the column protection temperature setter (24) is configured to set the column protection temperature by using the specification temperature held in the column information holder (20). According to such an aspect, the column protection temperature is automatically set even if the user does not input information necessary for setting the column protection temperature, and it is possible to omit time and effort for the user to input information.

In the first aspect, the column information holder (20) may be an IC tag (20) attached to the separation column.

In a second aspect of the embodiment of the analysis system according to the present invention, the column protection temperature setter (24) is configured to set a temperature input by the user as the column protection temperature. According to such an aspect, the user can set an optional temperature as the column protection temperature.

A third aspect of the embodiment of the analysis system according to the present invention further includes a column protection flow rate setter (26) configured to set a column protection flow rate for preventing deterioration of the separation column (12) due to pressure application, and the shutdown execution part (22) is configured to gradually decrease a liquid delivery flow rate of the liquid delivery pump to the column protection flow rate after starting the shutdown until a temperature of the internal space detected by the temperature sensor (18) reaches the column protection temperature. According to such an aspect, since a flow rate of a mobile phase flowing through the separation column (12) decreases as the temperature of the separation column (12) decreases, the pressure applied to the separation column (12) is relaxed, and it is possible to prevent deterioration of the separation column (12) due to pressure application.

In the third aspect, the shutdown execution part (22) may be configured to gradually decrease a liquid delivery flow rate of the liquid delivery pump (2) to zero after a temperature of the internal space detected by the temperature sensor (18) reaches the column protection temperature. As described above, by gradually decreasing the liquid delivery flow rate of the liquid delivery pump (2) to zero instead of suddenly stopping the driving of the liquid delivery pump (2) after the temperature of the internal space reaches the column protection temperature, it is possible to prevent a filler of the separation column (12) from being damaged by a rapid change in a mobile phase flow rate.

Further the third aspect may further include a flow rate decreasing time setter (28) configured to cause the user to input desired time and to set the time input by the user as flow rate decreasing time, and the shutdown execution part (22) may be configured to gradually decrease a liquid delivery flow rate of the liquid delivery pump (2) to the column protection flow rate over the flow rate decreasing time until a temperature of the internal space detected by the temperature sensor (18) reaches the column protection temperature. In this manner, the user can freely set a speed at which the liquid delivery flow rate of the liquid delivery pump (2) is decreased at the time of shutdown.

In the above case, the column protection flow rate setter (26) may be configured to set the column protection flow rate to a flow rate of ½ of a liquid delivery flow rate of the liquid delivery pump (2) of a time of starting of the shutdown, and the shutdown execution part (22) may be configured to gradually decrease a liquid delivery flow rate of the liquid delivery pump (2) to zero over the flow rate decreasing time after a temperature of the internal space detected by the temperature sensor (18) reaches the column protection temperature. In this way, a decreasing speed of the flow rate of the liquid delivery pump (2) before and after the temperature of the internal space decreases to the column protection temperature is determined only by the user setting one of the flow rate decreasing time, and work of setting a shutdown condition is facilitated.

In a fourth aspect of the embodiment of the analysis system according to the present invention, the column oven (6) includes a Peltier element (16) for cooling inside of the internal space, and the shutdown execution part (22) is configured to drive the Peltier element (16) to cool inside of the internal space at least until a temperature of the internal space detected by the temperature sensor (18) reaches the column protection temperature after starting the shutdown. According to such an aspect, since the temperature of the internal space can be quickly decreased after the shutdown is started, time required until the shutdown is completed can be shortened.

The first to fourth aspects according to the embodiment of the analysis system of the present invention can be freely combined with each other.

DESCRIPTION OF REFERENCE SIGNS

2: Liquid delivery pump
4: Autosampler
6: Column oven
8: Detector
10: Control device
12: Separation column
14: Heater
16: Peltier element
18: Temperature sensor
20: IC tag
22: Shutdown execution part
24: Column protection temperature setter
26: Column protection flow rate setter
28: Flow rate decreasing time setter

The invention claimed is:
1. A chromatography analysis system comprising:
a liquid delivery pump configured to deliver a mobile phase;
an autosampler fluidly connected downstream of the liquid delivery pump and configured to inject a sample into the mobile phase delivered by the liquid delivery pump;
a separation column that is fluidly connected downstream of the autosampler and configured to separate a sample into components;
a column oven having an internal space accommodating the separation column, a heater for heating inside of the internal space, and a temperature sensor configured to detect a temperature of the internal space, the column oven having a temperature control function of controlling a temperature of the separation column at a temperature higher than room temperature;

a detector configured to detect the components in eluate from the separation column;

a shutdown execution part configured to start shutdown to finally stop driving of the liquid delivery pump and temperature control operation of the column oven at a time when a predetermined situation occurs, by controlling operation of the liquid delivery pump and the column oven;

a column information holder configured to hold at least a specification temperature of the separation column; and a column protection temperature setter configured to set, based on the specification temperature, a column protection temperature for preventing deterioration of the separation column due to overheating, wherein the shutdown execution part is configured to stop driving of the heater of the column oven in a state where the liquid delivery pump is driven when the shutdown is started, and then, stop driving of the liquid delivery pump after a temperature of the internal space detected by the temperature sensor becomes equal to or less than the column protection temperature, and wherein the column information holder is an IC tag attached to the separation column.

2. The chromatography analysis system according to claim 1, further comprising:

a column protection flow rate setter configured to set a column protection flow rate for preventing deterioration of the separation column due to pressure application, wherein the shutdown execution part is configured to gradually decrease a liquid delivery flow rate of the liquid delivery pump to the column protection flow rate after starting the shutdown until the temperature of the internal space detected by the temperature sensor reaches the column protection temperature.

3. The chromatography analysis system according to claim 2, wherein the shutdown execution part is configured to gradually decrease the liquid delivery flow rate of the liquid delivery pump to zero after the temperature of the internal space detected by the temperature sensor reaches the column protection temperature.

4. The chromatography analysis system according to claim 2, further comprising:

a flow rate decreasing time setter configured to cause a user to input desired time and to set the time input by the user as a flow rate decreasing time, wherein the shutdown execution part is configured to gradually decrease the liquid delivery flow rate of the liquid delivery pump to the column protection flow rate over the flow rate decreasing time until the temperature of the internal space detected by the temperature sensor reaches the column protection temperature.

5. The chromatography analysis system according to claim 4, wherein the column protection flow rate setter is configured to set the column protection flow rate to a flow rate of ½ of the liquid delivery flow rate of the liquid delivery pump of a time of starting of the shutdown, and the shutdown execution part is configured to gradually decrease the liquid delivery flow rate of the liquid delivery pump to zero over the flow rate decreasing time after the temperature of the internal space detected by the temperature sensor reaches the column protection temperature.

6. A chromatography analysis system comprising:

a liquid delivery pump configured to deliver a mobile phase;

an autosampler fluidly connected downstream of the liquid delivery pump and configured to inject a sample into the mobile phase delivered by the liquid delivery pump;

a separation column that is fluidly connected downstream of the autosampler and configured to separate a sample into components;

a column oven having an internal space accommodating the separation column, a heater for heating inside of the internal space, and a temperature sensor configured to detect a temperature of the internal space, the column oven having a temperature control function of controlling a temperature of the separation column at a temperature higher than room temperature;

a detector configured to detect the components in eluate from the separation column;

a shutdown execution part configured to start shutdown to finally stop driving of the liquid delivery pump and temperature control operation of the column oven at a time when a predetermined situation occurs, by controlling operation of the liquid delivery pump and the column oven; and a column protection temperature setter configured to set a column protection temperature for preventing deterioration of the separation column due to overheating, wherein the shutdown execution part is configured to stop driving of the heater of the column oven in a state where the liquid delivery pump is driven when the shutdown is started, and then, stop driving of the liquid delivery pump after a temperature of the internal space detected by the temperature sensor becomes equal to or less than the column protection temperature, and wherein the column protection temperature setter is configured to set a temperature that is input by a user as the column protection temperature.

7. A chromatography analysis system comprising:

a liquid delivery pump configured to deliver a mobile phase;

an autosampler fluidly connected downstream of the liquid delivery pump and configured to inject a sample into the mobile phase delivered by the liquid delivery pump;

a separation column that is fluidly connected downstream of the autosampler and configured to separate a sample into components, a column oven having an internal space accommodating the separation column, a heater for heating inside of the internal space, and a temperature sensor configured to detect a temperature of the internal space, the column oven having a temperature control function of controlling a temperature of the separation column at a temperature higher than room temperature;

a detector configured to detect the components in eluate from the separation column;

a shutdown execution part configured to start shutdown to finally stop driving of the liquid delivery pump and temperature control operation of the column oven at a time when a predetermined situation occurs, by controlling operation of the liquid delivery pump and the column oven; and a column protection temperature setter configured to set a column protection temperature for preventing deterioration of the separation column due to overheating, wherein the shutdown execution part is configured to stop driving of the heater of the column oven in a state where the liquid delivery pump is driven when the shutdown is started, and then, stop driving of the liquid delivery pump after a temperature of the internal space detected by the temperature sensor becomes equal to or less than the column protection temperature, wherein the column oven includes a Peltier element for cooling inside of the internal space, and wherein the shutdown execution part is configured to drive the Peltier element to cool inside of the internal space at least until the temperature of the internal space detected by the temperature sensor reaches the column protection temperature after starting the shutdown.

* * * * *